(12) United States Patent
Dong et al.

(10) Patent No.: US 10,222,687 B2
(45) Date of Patent: Mar. 5, 2019

(54) LIGHT HOMOGENIZING DEVICE AND LASER PROJECTION APPARATUS

(71) Applicants: HISENSE CO., LTD., Shandong (CN); HISENSE USA CORP., Suwanee (GA); HISENSE INTERNATIONAL CO., LTD., Qingdao (CN)

(72) Inventors: Shubin Dong, Shandong (CN); Xiuyan Cao, Shandong (CN); Wensheng Lu, Shandong (CN); Xianglai Pang, Shandong (CN); Naiwen Hou, Shandong (CN)

(73) Assignees: HISENSE CO., LTD., Shandong (CN); HISENSE USA CORP., Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/310,526

(22) PCT Filed: Nov. 2, 2016

(86) PCT No.: PCT/CN2016/104386
§ 371 (c)(1),
(2) Date: Nov. 11, 2016

(87) PCT Pub. No.: WO2017/161890
PCT Pub. Date: Sep. 28, 2017

(65) Prior Publication Data
US 2018/0067386 A1   Mar. 8, 2018

(30) Foreign Application Priority Data

Mar. 21, 2016 (CN) .......................... 2016 1 0160366
Mar. 21, 2016 (CN) .......................... 2016 1 0160992
(Continued)

(51) Int. Cl.
*G03B 21/20* (2006.01)
*G03B 21/14* (2006.01)
(Continued)

(52) U.S. Cl.
CPC ............... *G03B 21/208* (2013.01); *G02B 27/0994* (2013.01); *G03B 21/142* (2013.01); *G03B 21/2033* (2013.01); *G03B 21/008* (2013.01)

(58) Field of Classification Search
CPC ............... G03B 21/208; G03B 21/142; G03B 21/2033; G03B 21/008; G02B 27/0994;
(Continued)

(56) References Cited

U.S. PATENT DOCUMENTS 6,394,611 B1    5/2002  Wang et al.
6,917,481 B2 *  7/2005  Shimizu ................... G02B 7/00
                                                    348/E5.143
(Continued)

FOREIGN PATENT DOCUMENTS

CN    1530737 A    9/2004
CN    1782858 A    6/2006
(Continued)

OTHER PUBLICATIONS

Office Action issued in corresponding Chinese Patent Application No. 201610160366.4, dated Jul. 26, 2017.
(Continued)

*Primary Examiner* — Bao Q Truong
(74) *Attorney, Agent, or Firm* — McDermott Will & Emery LLP

(57) ABSTRACT

Embodiments of the present invention provide a light homogenizing device and a laser projection apparatus. The light homogenizing device comprises a shell and a light stick, wherein the shell forms a holding chamber having openings at both ends thereof; the light stick is located
(Continued)

within the holding chamber, and the openings at both ends of the holding chamber correspond to an incident end and an emergent end of the light stick, respectively; and, an elastic component is provided on at least one surface of the shell, with a first end of the elastic component being connected to the shell while a second end thereof extending into the interior of the holding chamber and pressing against the light stick.

15 Claims, 10 Drawing Sheets

(30) Foreign Application Priority Data

Mar. 21, 2016 (CN) .......................... 2016 2 0218578
May 31, 2016 (CN) .......................... 2016 1 0379966

(51) Int. Cl.
*G02B 27/09* (2006.01)
*G03B 21/00* (2006.01)

(58) Field of Classification Search
CPC .......... G02B 7/00; G02B 7/001; G02B 7/003; F21Y 2115/30; F21V 17/00; F21V 17/10; F21V 17/16; F21V 17/164; F21V 21/00
See application file for complete search history.

(56) References Cited

U.S. PATENT DOCUMENTS

| | | | | |
|---|---|---|---|---|
| 7,249,857 | B2 * | 7/2007 | Lin ...................... | G03B 21/208 |
| | | | | 353/119 |
| 7,471,474 | B2 * | 12/2008 | Liu ........................ | G02B 7/023 |
| | | | | 359/822 |
| 7,530,698 | B2 * | 5/2009 | Chang .................... | G03B 21/14 |
| | | | | 353/119 |
| 7,883,218 | B2 * | 2/2011 | Yoshikawa ............ | G03B 21/28 |
| | | | | 353/122 |
| 8,128,234 | B2 * | 3/2012 | Huang ................. | G03B 27/547 |
| | | | | 353/119 |
| 2004/0239883 | A1 | 12/2004 | Yoshikawa | |
| 2005/0111818 | A1 * | 5/2005 | Wang ................... | G02B 6/4298 |
| | | | | 385/147 |
| 2006/0227304 | A1 | 10/2006 | Kang et al. | |
| 2007/0091285 | A1 | 4/2007 | Teng et al. | |
| 2009/0015802 | A1 | 1/2009 | Ho | |
| 2009/0262315 | A1 * | 10/2009 | Tseng ..................... | G03B 21/14 |
| | | | | 353/119 |
| 2015/0036107 | A1 * | 2/2015 | Nagahara ............. | G03B 21/208 |
| | | | | 353/31 |

FOREIGN PATENT DOCUMENTS

| | | |
|---|---|---|
| CN | 101354463 A | 1/2009 |
| CN | 101900925 A | 12/2010 |
| CN | 201965397 U | 9/2011 |
| CN | 102540662 A | 7/2012 |
| CN | 202393959 U | 8/2012 |
| CN | 103323951 A | 9/2013 |
| CN | 105629482 A | 6/2016 |
| CN | 105629483 A | 6/2016 |
| CN | 205427332 U | 8/2016 |
| DE | 20019521 U1 | 2/2001 |
| JP | 2011102904 A | 5/2011 |

OTHER PUBLICATIONS

Office Action issued in corresponding Chinese Patent Application No. 201610160992.3, dated Aug. 16, 2017.
International Search Report issued in International Application No. PCT/CN2016/104386, dated Jan. 25, 2017 (English translation).
Extended European Search Report issued in European Patent Application No. 16202973.3, dated Apr. 24, 2017.
Second Office Action issued in Chinese Patent Application No. 201610160366.4, dated Dec. 28, 2017 (English translation).
Office Action issued in Chinese Patent Application No. 201610160366.4, dated Jun. 11, 2018.

* cited by examiner

LIGHT HOMOGENIZING DEVICE AND LASER PROJECTION APPARATUS

CROSS-REFERENCE TO RELATED APPLICATIONS

The present application is the U.S. National Phase of PCT/CN2016/104386 filed Nov. 2, 2016, which claims the priority of Chinese Patent Application No. 201610379966.X, filed to the Chinese Patent Office on May 21, 2016, titled "LIGHT HOMOGENIZING DEVICE AND LASER PROJECTION APPARATUS"; Chinese Patent Application No. 201610160992.3, filed to the Chinese Patent Office on Mar. 21, 2016, titled "LIGHT HOMOGENIZING DEVICE AND LASER PROJECTION APPARATUS"; Chinese Patent Application No. 201610160366.4, filed to the Chinese Patent Office on Mar. 21, 2016, titled "LIGHT HOMOGENIZING DEVICE AND LASER PROJECTION APPARATUS"; and Chinese Patent Application No. 201620218578.9, filed to the Chinese Patent Office on Mar. 21, 2016, titled "LIGHT HOMOGENIZING DEVICE AND LASER PROJECTION APPARATUS", which are incorporated herein by reference in their entireties.

FIELD OF TECHNOLOGY

The present disclosure relates to the technical field of lasers, and in particular to a light homogenizing device and a laser projection apparatus.

BACKGROUND

Due to its advantages of excellent monochromaticity, high directivity, high luminous flux and the like, at present, the laser light as excellent coherent light has been widely applied in various fields, such as industry, healthcare, science & research, information and military. In the display field, it is more and more common to use the laser light as a light source.

Since the laser light is a high-energy light beam, small light spots are formed generally by beam shaping during the transmission thereof in a light path, so that the energy density of the laser becomes higher. If the energy density of the light spots is not uniform, it is likely to cause burns due to a too large local impact onto an optical lens, and meanwhile, non-uniform image brightness is caused after the light spots enter a lighting system of a light engine and are then projected. Therefore, it is expected that the utilized laser beam is a homogenized light beam. In the applications of the laser light, a light homogenizing component is a very important element, for example, a light stick, a diffuser film, a fly's-eye lens or the like. Wherein, the light stick is common, and is generally located at an output end of a light source and an input end of the lighting system of the light engine. The light stick can reflect light entering the interior of the light stick for multiple times so as to homogenize the light beam. Meanwhile, in accordance with the principle of constant etendue, the divergent angle of light can also be changed by adjusting the area of the incident end and the area of the emergent end of the light stick. However, since the light stick is generally made of glass and thus fragile, the light stick needs to be protected against breaking.

SUMMARY OF THE INVENTION

In the first aspect, an embodiment of the present invention provides a light homogenizing device, including a shell and a light stick;

the shell forms a holding chamber having openings at both ends thereof; the light stick is located within the holding chamber, and an incident end and an emergent end of the light stick correspond to the openings at both ends of the holding chamber, respectively; and, an elastic component is provided on at least one surface of the shell, with a first end of the elastic component being connected to the shell while a second end thereof extending into the interior of the holding chamber and pressing against the light stick.

In the second aspect, a laser projection apparatus is provided, including:

a laser light source, a light engine and a lens, which are arranged successively, wherein the light engine includes a light homogenizing device including a shell and a light stick;

the shell forms a holding chamber having openings at both ends thereof; the light stick is located within the holding chamber, and the openings at both ends of the holding chamber correspond to an incident end and an emergent end of the light stick, respectively; and, an elastic component is provided on at least one surface of the shell, with a first end of the elastic component being connected to the shell while a second end thereof extending into the interior of the holding chamber and pressing against the light stick.

BRIEF DESCRIPTION OF THE DRAWINGS

To describe the technical solutions in the embodiments of the present invention more clearly, the accompanying drawings to be used in the description of the embodiments will be briefly described below. Apparently, the accompanying drawings described hereinafter are merely some of the embodiments of the present invention, and a person of ordinary skill in the art can obtain other drawings according to these drawings without paying any creative effort.

Figure 1:
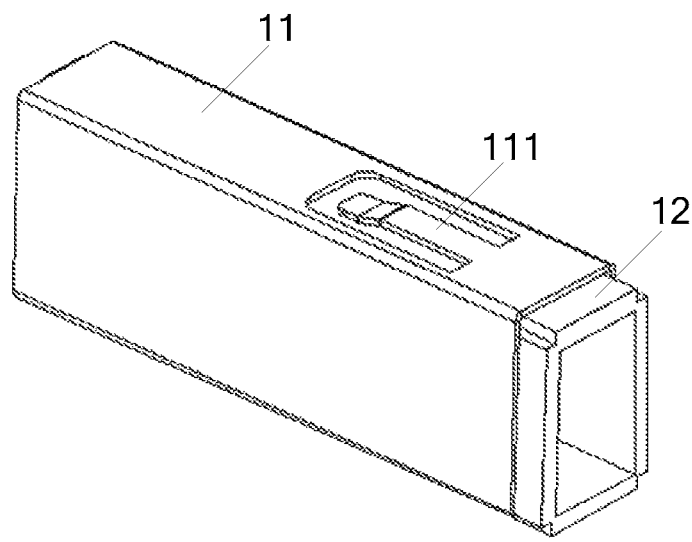
FIG. 1 is a first schematic structure diagram of a light homogenizing device according to an embodiment of the present invention.

Reference numerals:

11: shell;   12: light stick;   111: elastic component;   20: joint;
112: window;   113: protrusion;
51: end face of the opening at the first end of the shell;
52: end face of the opening at the second end of the shell;
121: incident end of the light stick;   122: emergent end of the light stick;
80: adjustment structure;   81: adjustment hole;
82: adjustment protrusion;   83: elastic support component;
90: end of the adjustment protrusion in contact with the shell;
801: first adjustment support;   802: second adjustment support;
84: bent portion of the first adjustment support;
85: bent portion of the second adjustment support;
841: through hole on the bent portion of the first adjustment support;
851: through hole on the bent portion of the second adjustment support;
86: press-fitting component;   861: press;
130: through hole of the first adjustment support;
15: pedestal;   16: support;   17: locking component;
18: elastic support component;
151: bottom plate;   152: first side plate;   153: second side plate;
1531: groove;   161: horizontal rib;   162: vertical rib;
171: adjustment hole;   172: adjustment protrusion;
190: claw;   191: first through hole;   192: second through hole;
193: positioning hole;   194: positioning column;
21: laser light source;   22: light engine;   23: lens;   24: slide screen;
211: laser device;   212: fluorescent wheel;   213: color filter wheel;
221: light homogenizing device;   222: light path device; and   223: DMD chip.

DETAILED DESCRIPTION OF THE PREFERRED EMBODIMENTS

The technical solutions in the embodiments of the present invention will be clearly and completely described below with reference to the accompanying drawings in the embodiments of the present invention. Apparently, the embodiments described herein are merely a part of but not all of the embodiments of the present invention. All other embodiments obtained by a person of ordinary skill in the art on the basis of the embodiments in the present invention without paying any creative effort shall fall into the protection scope of the present invention.

It is to be noted that, the orientation or position relation indicated by terms "upper", "lower", "front", "rear", "left", "right", "top", "bottom", "inside", "outside" or the like is an orientation or position relation shown based on the accompanying drawings, merely for describing the present disclosure and simplifying the description but not for indicating or implying that the specified device or element must have a particular orientation or be constructed and operated in a particular orientation. Therefore, the terms cannot be interpreted as limiting the present disclosure.

In addition, the phrase "A and/or B" in the embodiments of the present disclosure indicates three choices: 1) A; 2) B; and 3) both A and B. In other words, the phrase "and/or" can show the "and" relationship or the "or" relationship.

Generally, a laser display device includes a laser light source, a light engine, a lens, a projection screen or other components. Wherein, the laser light source may include a laser device, a fluorescent wheel, a color filter wheel or other components. The laser device may be a monochromatic laser device or may also be a bichromatic laser device. At least one kind of fluorescent powder is provided on the fluorescent wheel, and laser light emitted by the laser device can be mixed with exciting light generated by the fluorescent wheel to form white light. The color filter wheel is configured to filter the mixed light in order to improve the purity of fluorescence. The light engine includes a light homogenizing device, a light path device, a Digital Micro mirror Device (DMD) chip or other components. Light beams sequentially output by the color filter wheel enter the light homogenizing device for homogenizing and/or for changing the divergent angle, so that the light beams meet the requirements of the DMD on the beam energy distribution and the incident angle. Then, light is transmitted to the DMD chip by the light path device, and the DMD chip receives light of three primary colors and is rotated within a certain range under the driving of the current so as to adjust the amount of light entering the lens, so that different colors are presented on the lens. The lens receives the light modulated by the DMD, and the light is eventually transmitted to the projection screen by refraction, reflection or other processes by a plurality of optical lenses so as to form a projected image. Wherein, the homogenizing device may be specifically a light stick, and a light beam is homogenized by reflecting light entering the interior of the light stick for multiple times. In addition, in accordance with the principle of constant etendue, the divergent angle of light can also be changed by adjusting the area of the incident end and the area of the emergent end of the light stick.

An embodiment of the present invention provides a light homogenizing device. As shown in FIG. 1, the light homogenizing device includes a shell 11 and a light stick 12.

Wherein, the shell 11 forms a holding chamber having openings at both ends thereof. The light stick 12 is located within the holding chamber, and an incident end and an emergent end of the light stick 12 correspond to the openings at both ends of the holding chamber, respectively. An elastic component 111 is provided on at least one surface of the shell 11. A first end of the elastic component 111 is connected to the shell 11, while a second end thereof extends into the interior of the holding chamber and presses against the light stick 12.

"The first end of the elastic component 111 is connected to the shell 11" in the embodiment may specifically means that the first end of the elastic component 111 is fixedly connected to the shell 11, or means that the first end of the elastic component 111 is in contact with the shell 11 but not fixedly connected to the shell 11. "The second end of the elastic component 111 presses against the light stick 12" in the embodiment merely means that the second end of the elastic component 111 is in contact with the light stick 12, that is, the second end of the elastic component 111 is not fixedly connected to the light stick 12.

Exemplarily, the elastic component 111 in the embodiment may be specifically an elastic sheet, a spring or the like.

It is to be noted that the shell 11 in the embodiment of the present invention may be an integrated metal shell. For example, the shell is made of copper, aluminum, alloy or other metals by a casting process. In addition, the shell 11 in the embodiment of the present invention may also be an integrated nonmetal shell. For example, the shell is made of plastics, ceramic, rubber, resin or other nonmetals by an injection-molding process or other processes. Further, the shell may also be made of a sheet. Optionally, the sheet is a sheet metal, and the shell in the embodiment of the present invention is manufactured by a sheet metal process. The manufacturing process is specifically as follows: first, a rectangular sheet adapted to the size of the shell is obtained by a shearing process; then, the redundant sheet is removed by a punching process at a position where an elastic sheet is to be formed; subsequently, the reserved sheet for forming the elastic sheet is stamped to form an elastic component; and finally, the sheet is bent to form the shell in the embodiment of the present invention. In comparison with the integrated shell, manufacturing the shell from a sheet in the embodiment of the present invention has a simple process flow. Therefore, the shell in a preferred embodiment of the present invention is manufactured by a sheet.

If the shell 11 is manufactured by one or more sheets, the shell has joints for the sheets. Specifically, as shown in FIG. 2, the shell 11 is manufactured by at least one sheet, and the sheet is lap-joined and fixed at a joint 20.

Figure 2:
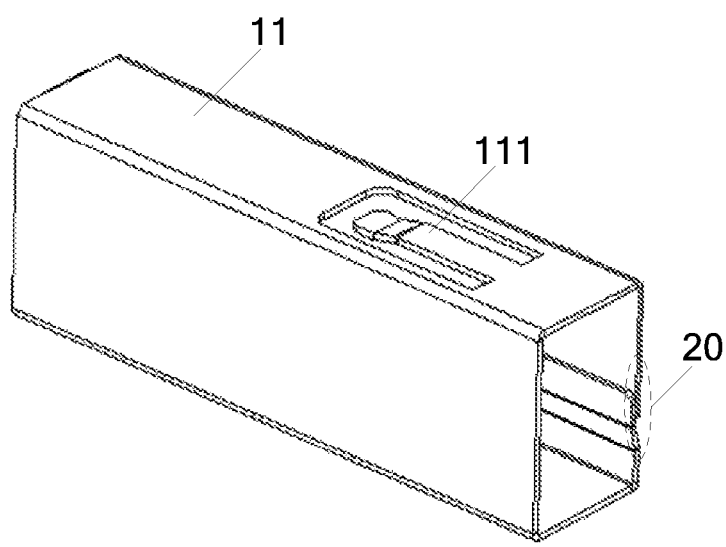
FIG. 2 is a first schematic structure diagram of a shell according to an embodiment of the present invention.

Wherein, in FIG. 2, description is given by taking the shell manufactured by one sheet as an example. Accordingly, there is only one joint 20 on the shell 11. If the shell 11 is formed by splicing more than two sheets, there are more than two joints 20 on the shell 11. The sheets may be fixed at the joints 20 by adhering, welding, riveting or in other ways. Optionally, the sheets are fixed by a spot-welding process. For example, edges on two ends of the sheets and the middle positions of the joints are spot-welded for three times by spot-welding. By lap-jointing and fixing the joints, when the shell is pressed by an external force, the force will extend and be buffered along the contact surface formed by lap-jointing, and the sheets on two sides of the joints are less likely to be mal-positioned and deformed, so that the light stick within the shell may be further prevented from being damaged by the external force.

It is also to be noted that, in an embodiment of the present invention, as in FIG. 1 and FIG. 2, description is given by taking the elastic component 111 being an elastic sheet and the elastic sheet being merely provided on the top surface of the shell 11 as an example, but the embodiments of the present invention are not limited thereto. When the shell 11 provided in an embodiment of the present invention includes only one elastic sheet, the elastic sheet may be located on any one of the top surface, bottom surface, left surface and right surface of the shell 11. In addition, the number of elastic sheets is not limited in the embodiments of the present invention. The shell 11 may also include any number of elastic sheets, for example, four elastic sheets which may be located on the top surface, bottom surface, left surface and right surface of the shell 11, respectively. Apparently, if the shell 11 includes more elastic sheets, the fixation between the shell 11 and the light stick 12 is more stable, but the manufacturing difficulty will increase with the increase of the number of the elastic sheets. Therefore, in practices, an appropriate number of elastic sheets may be provided according to the actual requirements.

Further, the light stick in the embodiment may be solid or hollow (in FIG. 1, taking the light stick being hollow as an example). When the light stick is solid, the light stick may be formed by cutting a transparent material (for example, glass, optical plastics, transparent inorganic ceramic or the like) according to a preset shape of the light stick; however, when the light stick is hollow, the shape of each surface of the light stick may be formed by cutting a reflective material (for example, a reflector, a reflecting mirror or the like), and then the surfaces formed by cutting are enclosed to form the light stick. In the embodiment of the present invention, the specific structure of the light stick is not limited.

The light homogenizing device provided in the embodiment of the present invention includes a shell and a light stick, wherein the shell forms a holding chamber having openings at both ends thereof; the light stick is located within the holding chamber, and the openings at both ends of the holding chamber correspond to an incident end and an emergent end of the light stick, respectively; and, an elastic component is provided on at least one surface of the shell, with a first end of the elastic component being connected to the shell while a second end thereof extending into the interior of the holding chamber and pressing against the light stick. Since the incident end and the emergent end of the light stick correspond to the openings at both ends of the holding chamber formed by the shell, the incident end and the emergent end of the light stick may be prevented from being shielded. Moreover, since an elastic component is provided on at least one surface of the shell, and one end of the elastic component is connected to the shell while the other end thereof presses against the light stick, the elastic component may realize the fixation of the light stick, so that the light homogenizing device can operate normally. Furthermore, since the light stick is located inside the shell, an external force may act on the shell first when the external force is applied to the light homogenizing device, so that the fragile light stick is prevented from being damaged. Consequently, in this embodiment of the present invention, the light homogenizing device may be prevented from being damaged when pressed by an external force.

On the basis of the light homogenizing device provided in the above embodiment, an embodiment of the present invention further provides another light homogenizing device. A difference between the light homogenizing device provided in this embodiment and that provided in the above embodiment lies in that the shell 11 is adhered to the light stick 12.

Since the light stick 12 needs to be placed within the holding chamber formed by the shell 1, the volume of the holding chamber formed by the shell 11 is generally greater than the size of the light stick 12. Although the light stick 12 may be fixed by the elastic component 111, the light stick 12 might shake within the holding chamber formed by the shell 11, thereby influencing the utilization of light by the light homogenizing device. Therefore, it is also possible to further adhere the shell 11 to the light stick 12, so that the fixation of the light stick is more reliable.

Figure 3:
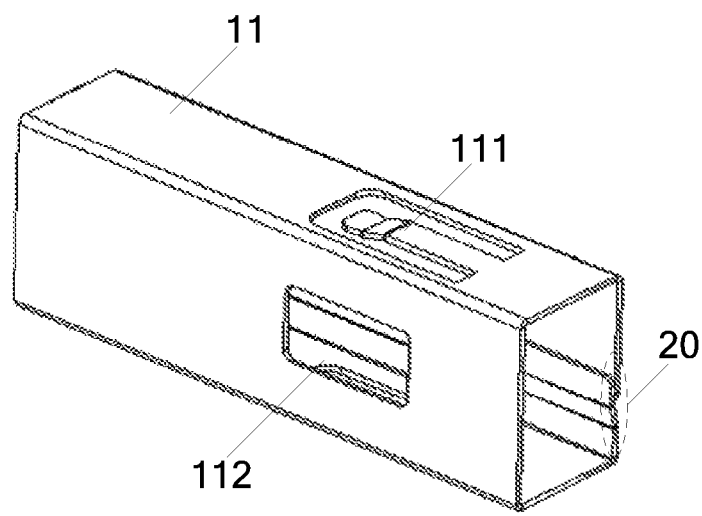
FIG. 3 is a second schematic structure diagram of the shell according to an embodiment of the present invention.

Further, as shown in FIG. 3, a window 112 is provided on at least one surface of the shell 11. The window 112 is configured to inject an adhesive between a side wall of the light stick 112 and an inner wall of the shell 11.

Exemplarily, the adhesive may be specifically photosensitive adhesive, glue, resin or the like. In addition, when the adhesive is photosensitive adhesive, the window 112 may be configured to not only inject the photosensitive adhesive but also cure the injected photosensitive adhesive.

In this embodiment of the present invention, the specific position and the number of the window 112 are not limited as long as the adhesive can be injected between the side wall of the light stick 12 and the inner wall of the shell 11.

A process of injecting the adhesive will be described below by taking the adhesive being photosensitive adhesive as an example. First, the photosensitive adhesive is injected between the side wall of the light stick 12 and the inner wall of the shell 11 through the window 112, so that a gap between the side wall of the light stick 21 and the inner wall of the shell 11 is filled by the photosensitive adhesive; and then, the photosensitive adhesive is cured by light irradiation at the window 212, at the openings at both ends of the shell 11, or at other positions.

By providing the window 112 on the shell 11, the difficulty of the process of adhering the shell 11 to the light stick 12 may be reduced, and the adhesive may be prevented from polluting the incident end and the emergent end of the light stick 12.

Figure 4:
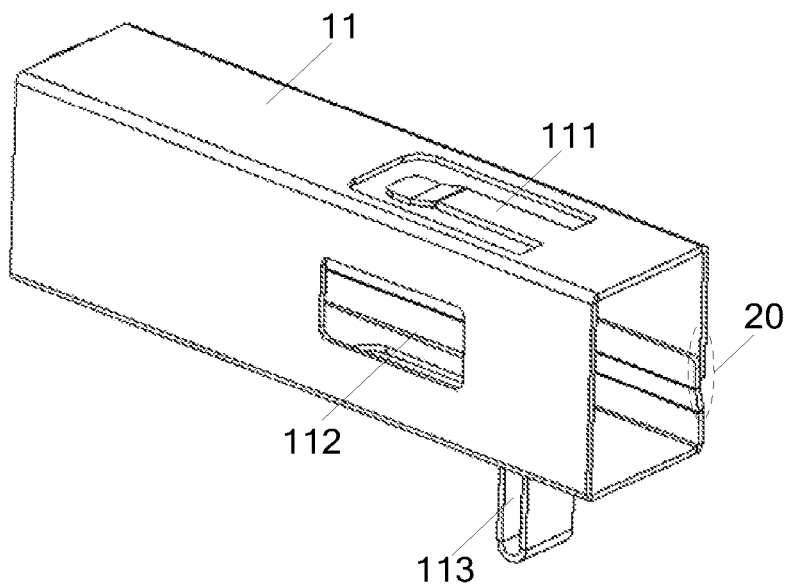
FIG. 4 is a third schematic structure diagram of the shell according to an embodiment of the present invention.

On the basis of the light homogenizing device provided in the above embodiment, an embodiment of the present invention further provides another light homogenizing device. Specifically, as shown in FIG. 4, at least one protrusion 113 is provided on an outer surface of the shell 11. The protrusion 113 is configured to position the light homogenizing device when mounting the light homogenizing device.

The position of the light homogenizing device as an optical component in a light path is preset. Therefore, after the light stick 12 is placed within the shell 11 to form the light homogenizing device, it is required to place the light homogenizing device at the preset position in the light path. By providing the protrusion 113, the light homogenizing device may be positioned according to the position of the protrusion 13 in the mounting process of the light homogenizing device, so that the light homogenizing device is accurately placed at the preset position in the light path.

It is also to be noted that, in FIG. 4, description is given by taking the protrusion 113 being provided on the outer bottom surface of the shell, but the embodiments of the present invention are not limited thereto. In the embodiments of the present invention, the protrusion 113 may also be provided at other positions of the shell 11. In addition, in the embodiments of the present invention, it is also possible to provide a plurality of (for example, two) protrusions 113 on the shell 11. By providing a plurality of protrusions 113, the positioning of the light homogenizing device in the mounting process is more accurate.

Figure 5:
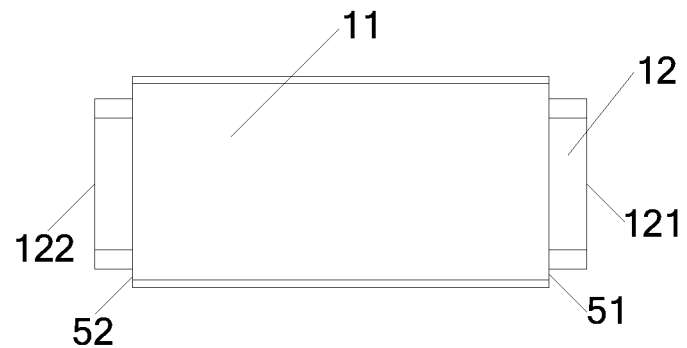
FIG. 5 is a side view of a shell and a light stick according to an embodiment of the present invention.

On the basis of the light homogenizing device provided in the above embodiment, an embodiment of the present invention further provides another light homogenizing device. Specifically, as shown in FIG. 5, a distance between the end faces 51, 52 at both ends of the shell 11 is smaller than a distance between the incident end 121 and the emergent end 122 of the light stick 12.

In the mounting process of the light homogenizing device, the light homogenizing device is positioned by reference to a certain component on the supporting pedestal. Therefore, the position of the light stick of the light homogenizing device can be ensured to be accurate only when the light homogenizing device is fitted to this component. However, in practices, the shell 11 is generally a sheet metal machined part, and the machining tolerance of the sheet metal machined part is generally greater than that of an optical device (i.e. the light stick). If the shell 11 and the light stick 12 are manufactured in a same size, the distance between the openings at both ends of the shell 11 may be greater than the distance between the incident end 121 and the emergent end 122 of the light stick 12. Consequently, when the light homogenizing device is mounted and fixed, the shell 11 will influence the positioning of the light homogenizing device, so as to influence the positioning of the light stick 12. Therefore, optionally, the distance between the openings at both ends of the shell 11 should be smaller than the distance between the incident end 121 and the emergent end 122 of the light stick, in order to avoid the influence on the positioning of the light stick.

Figure 6:
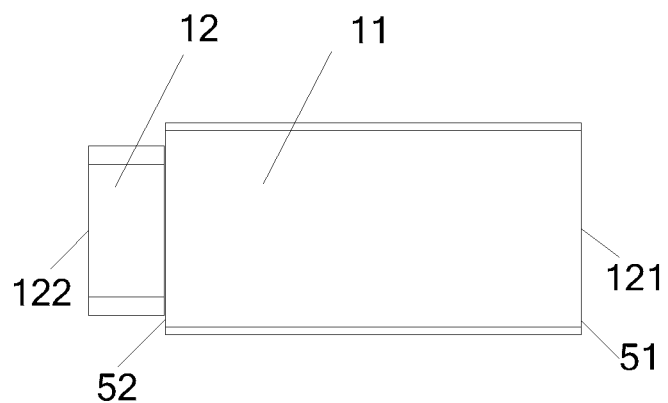
FIG. 6 is a side view of another shell and a light stick according to an embodiment of the present invention.
Figure 7:
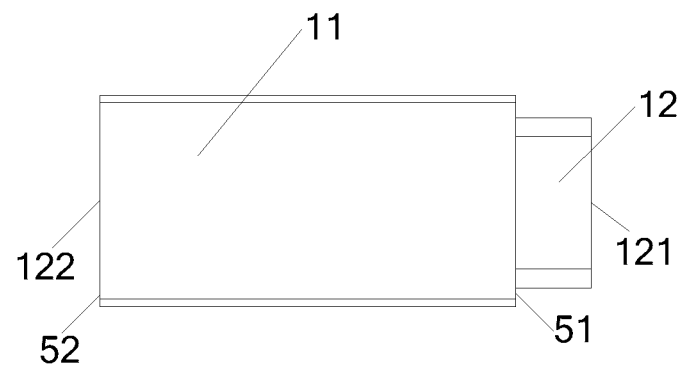
FIG. 7 is a side view of still another shell and a light stick according to an embodiment of the present invention.

Specifically, as shown in FIG. 6, an end face 51 of the opening at the first end of the shell 11 is aligned to the incident end 121 of the light stick 12, and an end face 52 of the opening at the second end of the shell 11 is located between a surface of the incident end 121 and a surface of the emergent end 122 of the light stick 12. Or, as shown in FIG. 7, the end face 52 of the opening at the second end of the shell 11 is aligned to emergent end 122 of the light stick 12, and the end face 51 of the opening at the first end of the shell 11 is located between a surface of the incident end 121 and a surface of the emergent end 122 of the light stick 12.

The shell in the light homogenizing device provided in the above embodiment may prevent the light stick from being damaged by an external force in the mounting and adjustment process. Therefore, an adjustment structure for adjusting the position of the light stick may be further provided on the basis of the above embodiment. Therefore, optionally, the light homogenizing device provided in this embodiment of the present invention further includes an adjustment structure for adjusting the position of the shell. Since the shell and the light stick within the holding chamber formed by the shell are fixed relative to each other, when the light homogenizing device is adjusted, first, the position of the shell is adjusted by the adjustment structure, and then the light stick is driven to move by the shell.

Figure 8:
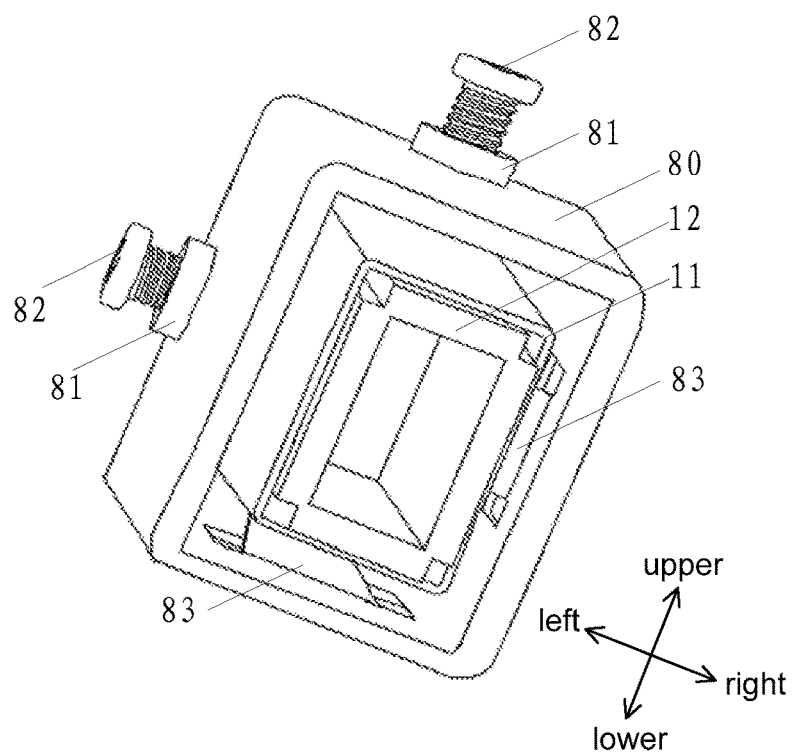
FIG. 8 is a second schematic structure diagram of the light homogenizing device according to an embodiment of the present invention.

Specifically, as shown in FIG. 8, an embodiment of the present invention further provides an adjustment structure.

The adjustment structure 80 forms an accommodating chamber having openings at both ends thereof. The shell 11 is located within the accommodating chamber, and the openings at both ends of the accommodating chamber correspond to the openings at both ends of the holding chamber formed by the shell 11, respectively. In other words, an incident end 121 and an emergent end 122 of the light stick 12 within the shell 11 correspond to the openings at both ends of the accommodating chamber, respectively. Adjustment holes 81 and adjustment protrusions 82 adapted to the adjustment holes 81 are formed on at least one surface of the adjustment structure 80, and the adjustment protrusions 82 pass through the adjustment holes 81 and press against the shell 11. Elastic support components 83 are provided on a surface opposite to the surface on which the adjustment holes 81 are formed. A first end of each of the elastic support components 83 is connected to the adjustment structure 80, while a second end thereof extends into the interior of the accommodating chamber and presses against the shell 11.

Similarly, "the first end of each of the elastic support components 83 is connected to the adjustment structure 80" in this embodiment may specifically means that the first end of each of the elastic support components 83 is fixedly connected to the adjustment structure 80, or means that the first end of each of the elastic support components 83 is in contact with the adjustment structure 80 but not fixedly connected to the adjustment structure 80. "The second end of each of the elastic support components 83 presses against the shell 11" in this embodiment merely means that the second end of each of the elastic support components 83 is in contact with the shell 11, that is, the second end of each of the elastic support components 83 is not fixedly connected to the shell 11.

Exemplarily, the adjustment holes 81 may be specifically threaded holes, unthreaded holes or the like, the adjustment protrusions 82 may be specifically screws, bolts or the like, and the elastic support components 83 may be specifically elastic sheets, springs or the like.

It is to be noted that, the adjustment structure in this embodiment of the present invention may be formed by enclosing a plurality of independent cover plates, for example, four independent cover plates, wherein adjustment holes 81 and adjustment protrusions 82 adapted to the adjustment holes 81 are formed on two of the cover plates, elastic support components 83 are formed on the other two of the cover plates, and the four independent cover plates are connected and fixed together by adhering, welding, fixing by adjustment screws or in other ways to form an accommodating chamber with openings at both ends thereof. In addition, the adjustment structure in this embodiment of the present invention may also be formed integrally. In the mounting process of the light stick, the differences between the integrated adjustment structure and the adjustment structure including a plurality of independent cover plates lie in that: for the adjustment structure including a plurality of independent cover plates, the light stick may be first placed within the accommodating chamber formed by the plurality of cover plates and then fixed, or, the plurality of cover plates may be fixed to form the accommodating chamber first and then the light stick is put into the accommodating chamber from an opening at one end where an included angle between the elastic support component and the accommodating chamber is an obtuse angle; in contrast, for the integrated adjustment structure, the light stick may be placed within the accommodating chamber formed by the adjustment chamber only in the latter way.

A specific adjustment method of the light homogenizing device will be described below in details by taking the adjustment holes 81 being threaded holes, the adjustment protrusions 82 being screws and the elastic support components 83 being elastic sheets as an example. Based on the orientation shown in FIG. 8, when the light stick 12 needs to be adjusted downward, the screw on the top of the adjustment structure may be rotated clockwise to push the screw toward the accommodating chamber so as to press against the shell 11, then the shell 12 presses against the elastic sheet on the bottom of the adjustment structure 80 to allow the elastic sheet to be deformed, and the shell 11 drives the light stick 12 therein to move downward; and, when the light stick 12 needs to be adjusted upward, the screw on the top of the adjustment structure 80 may be rotated counterclockwise to reduce the length of the screw extending into the accommodating chamber, and the shell 11 is moved upward under the action of the upward elastic force of the elastic sheet on the bottom of the adjustment structure 80 so as to drive the light stick 12 to move upward. Similarly, when the light stick 12 needs to be adjusted rightward, the screw on the left side of the adjustment structure may be rotated clockwise; and, when the light stick 12 needs to be adjusted leftward, the screw on the left side of the adjustment structure 80 may be rotated counterclockwise.

Further, it can be seen from the adjustment process of the light stick that, if an adjustment hole and an adjustment protrusion adapted to the adjustment hole are formed on only one surface of the light homogenizing device, and an elastic support component is provided on a surface opposite to this surface, the light homogenizing device may realize the adjustment of the light stick in one direction; and, if adjustment holes and adjustment protrusions are formed on a plurality of surfaces of the adjustment structures, and elastic sheets are provided on surfaces opposite to these surfaces on which the adjustment holes are formed, the adjustment of the light stick in multiple directions may be realized. Therefore, optionally, adjustment holes and adjustment protrusions are formed on two vertical surfaces of the adjustment structure, and elastic support components are provided on surfaces opposite to the surfaces on which the adjustment holes are formed, so that the adjustment of the light stick in the upper, lower, left and right directions may be realized by the two groups of the adjustment holes, the adjustment protrusions and the elastic support components. By forming the adjustment holes and the adjustment protrusions on two vertical surfaces of the adjustment structure and providing the elastic support components on surfaces opposite to the surfaces on which the adjustment holes are formed, the adjustment of the light stick in any direction other than the axial direction may be realized. Therefore, such a design may simplify the structure of the light homogenizing device, and thus simplify the process flow of manufacturing the light homogenizing device.

In addition, it is also to be noted that, since the acting force generated by the adjustment protrusions is opposite to that generated by the elastic support components, the adjustment structure may also reduce the movement step length of the adjustment protrusions during adjustment and thus improve the accuracy of adjustment.

The adjustment structure provided in this embodiment of the present invention forms an accommodating chamber having openings at both ends thereof; the shell is located within the accommodating chamber, and the openings at both ends of the accommodating chamber correspond to an incident end and an emergent end of the light stick, respectively; adjustment holes and adjustment protrusions adapted to the adjustment holes are formed on at least one surface of the adjustment structure, and the adjustment protrusions may pass through the adjustment holes and presses against the shell within the accommodating chamber; and, elastic support components are provided on a surface opposite to the surface on which the adjustment holes are formed, with a first end of each of the elastic support components being connected to the adjustment structure while a second end thereof extending into the interior of the accommodating chamber and pressing against the shell. Therefore, by rotating the elastic support components in a forward direction, the elastic support components may be allowed to be pushed toward the accommodating chamber so as to press against the shell within the accommodating chamber, so that the shell is moved in a direction away from the surface on which the adjustment holes are formed; similarly, by rotating the elastic support components in a reverse direction, the length of the elastic support components extending into the accommodating chamber is reduced, so that the elastic support components on a surface opposite to the surface on which the adjustment holes are formed make the light stick close to the surface on which the adjustment holes are formed. Consequently, the light homogenizing device provided in this embodiment of the present invention may realize the adjustment of the position of the light stick. In addition, it can be seen from the adjustment process that, both the acting force generated by the elastic support components and the acting force generated by the adjustment protrusions act on the shell during the adjustment process, and the light stick is driven to move by the shell, so that the shell may prevent an external force from directly acting on the light stick. Therefore, in this embodiment of the present invention, the shell may also prevent the light stick from being damaged by an external force during the adjustment process.

Further, since the light homogenizing device provided in this embodiment may realize the adjustment of the position of the light stick, more incident light may be received by adjusting the incident end of the light stick, and/or the emergent light is projected to a designed position by adjusting the emergent end of the light stick. As can be seen, this embodiment of the present invention may also improve the utilization of light.

Figure 9:
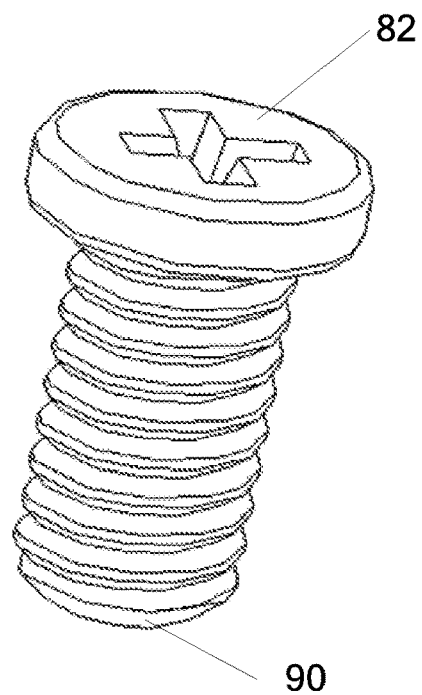
FIG. 9 is a schematic structure diagram of an adjustment screw according to an embodiment of the present invention.

An embodiment of the present invention further provides an improved structure of adjustment protrusions. Specifically, as shown in FIG. 9, an end 90 of each of the adjustment protrusions 82 contacting with the shell 11 is hemispherical.

With the end 90 of each of the adjustment protrusions 82 which is in contact with the shell 11 being hemispherical, the contact of the shell with the adjustment protrusions 82 may be point contact. Consequently, the friction generated when rotating the adjustment screws may be reduced during the adjustment process, the adjustment becomes smoother, and the adjustment distance may be controlled more accurately.

Optionally, an anaerobic adhesive is coated on the surfaces of the adjustment protrusions 82.

Wherein, the anaerobic adhesive is a special engineering resin coated on screws, bolts or other structures, and is highly stable and resistant to acids, alkalis and other solvents. By coating the anaerobic adhesive on the surfaces of the adjustment protrusions 82, the contact between the adjustment protrusions 82 and the adjustment holes 81 may be closer, and the adjustment protrusions 82 may be prevented from loosing and falling due to shocks in the long-term use process.

Figure 10:
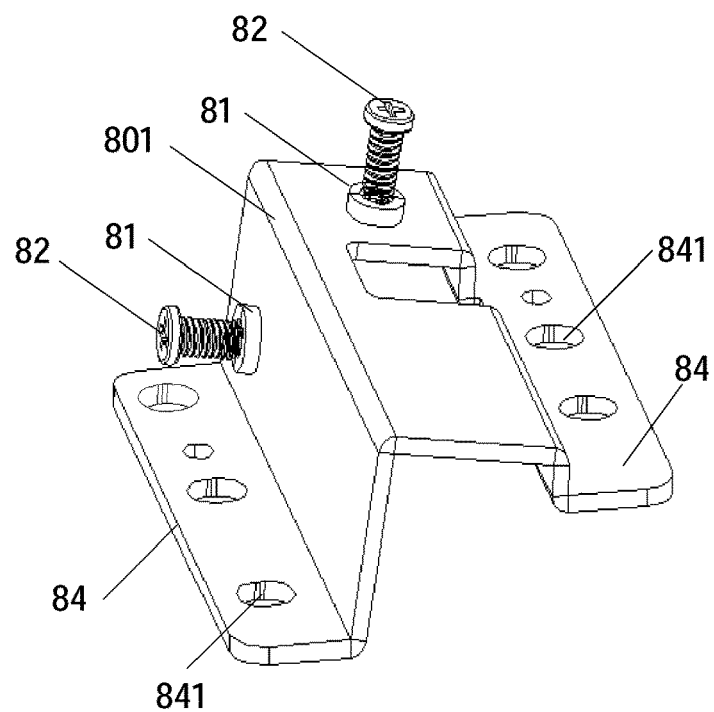
FIG. 10 is a schematic structure diagram of a first adjustment support of the adjustment structure according to an embodiment of the present invention.
Figure 11:
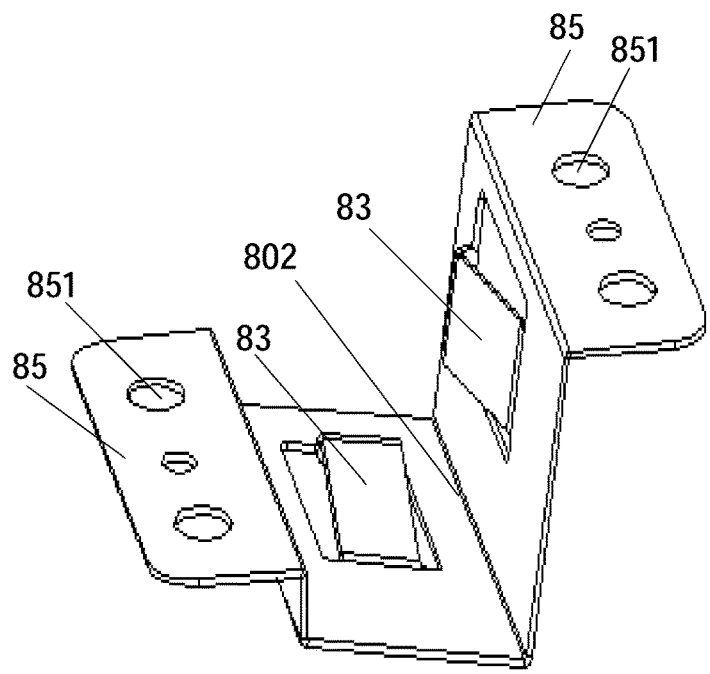
FIG. 11 is a schematic structure diagram of a second adjustment support of the adjustment structure according to an embodiment of the present invention.

An embodiment of the present invention further provides another light homogenizing device. Specifically, as shown in FIGS. 10 and 11, the adjustment structure 80 includes a first adjustment support 801 and a second adjustment support 802. Wherein, FIG. 10 is a schematic structure diagram of the first adjustment support 801, and FIG. 11 is a schematic structure diagram of the second adjustment support 802.

The first adjustment support 801 includes a first wallboard and a second wall board, and the second adjustment support 802 includes a third wallboard and a fourth wallboard. The first wallboard, the second wallboard, the third wallboard and the fourth wallboard are enclosed to form the accommodating chamber. Adjustment holes 81 and adjustment protrusions 82 adapted to the adjustment holes 81 are formed on both the first wallboard and the second wallboard, and elastic support components 83 are provided on the third wallboard and the fourth wallboard respectively.

In other words, the adjustment structure 80 is formed by the first adjustment support 801 and the second adjustment support 802, the adjustment holes 81 and the adjustment protrusions 82 are formed on the first adjustment support, and the elastic support components 83 are formed on the second adjustment support. Therefore, it is possible to manufacture two adjustment holes 81 on an alloy sheet and then bend the alloy sheet to form the first adjustment support; similarly, it is possible to manufacture two elastic support components 83 on another alloy sheet and then bend the alloy sheet to form the second adjustment support, so that the adjustment structure is formed by enclosing the first adjustment support 801 and the second adjustment support 802. Accordingly, the manufacture process of the adjustment structure may be simplified, and it is suitable for batch production.

In this embodiment, the first adjustment support 801 and the second adjustment support 802 may be fixed by adhering, welding, fixing with screws or in other ways. Optionally, as shown in FIG. 10, bent portions 84 are formed on a left edge and a right edge of the first adjustment support 801, and through holes 841 are formed on the bent portions 84. Meanwhile, as shown in FIG. 11, bent portions 85 are formed on a left edge and a right edge of the second adjustment support 802, and through holes 851 are formed on the bent portions 85. Screws, bolts, pins or other fixing components are allowed to pass through the through holes formed on the bent portions of both the first adjustment support and the second adjustment support, and the first adjustment support 801 and the second adjustment support 802 are fixed by the fixing components. Fixing the first adjustment support 801 and the second adjustment support 802 by fixing components is advantageous for the disassembly and maintenance of the adjustment structure in the later stage.

Figure 12:
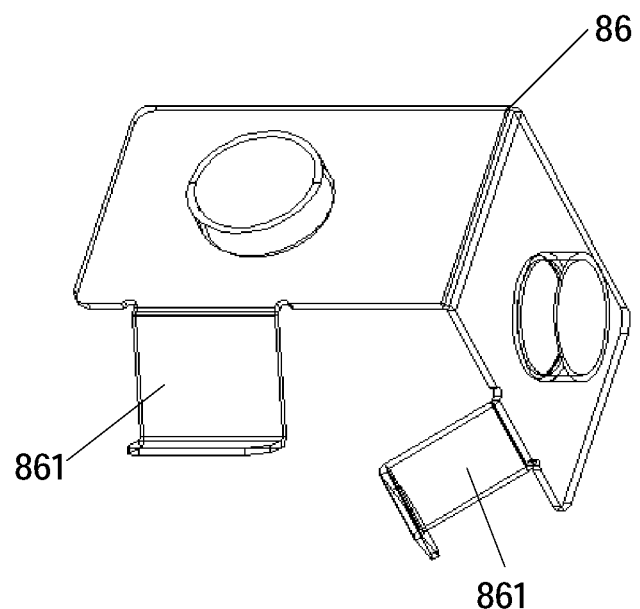
FIG. 12 is a schematic structure diagram of a press-fitting component according to an embodiment of the present invention.

Optionally, as shown in FIG. 12, the light homogenizing device further includes a press-fitting component 86 connected to the first adjustment support 801; and a press 861 is provided on the press-fitting component 86, and a first end of the press 861 is fixed to the press-fitting component 86 while a second end thereof extends into the interior of the accommodating chamber and presses against the shell 11.

By providing the press-fitting component 86, the fixation of the light homogenizing device becomes firmer, and the pressure in each direction may be received by the light stick, so that the light stick is fixed at a preset position inside the accommodating chamber.

Optionally, the first adjustment support 801 and the press-fitting component 86 are formed integrally. By integrally forming the first adjustment support 801 and the press-fitting component 86, the manufacture process of the light homogenizing device may be simplified.

Figure 13:
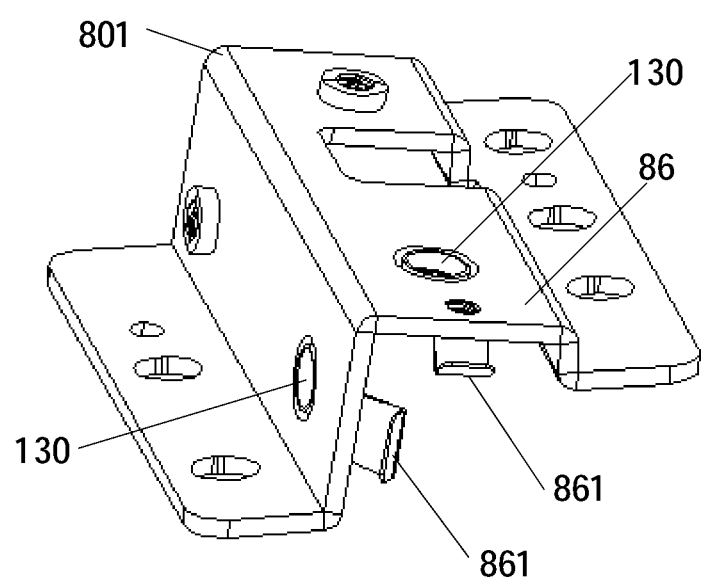
FIG. 13 is a schematic structure diagram after the first adjustment support and the press-fitting component are mounted, according to an embodiment of the present invention.

Optionally, as shown in FIG. 13, through holes 130 are formed on the press-fitting component 86 at positions corresponding to that on the first adjustment support 80, and the first adjustment support 801 and the press-fitting component 86 are fixed by screws.

The first adjustment support 801 and the press-fitting component 86 are independent of each other and fixed by screws. In the mounting process of the light homogenizing device, the shell provided with the light stick may be first placed within the accommodating chamber formed by the adjustment structure, and the press-fitting component is then mounted, so that the mounting becomes simple.

Figure 14:
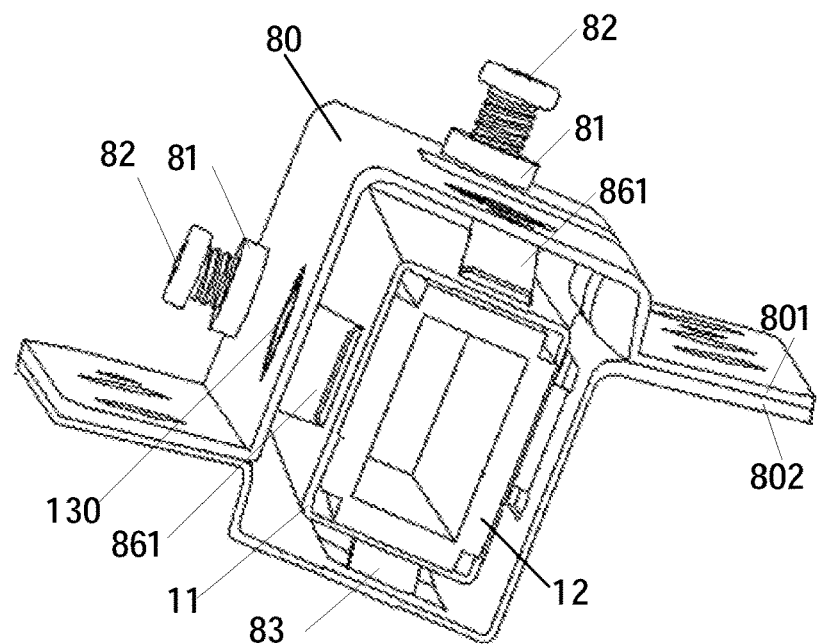
FIG. 14 is a third schematic structure diagram of the light homogenizing device according to an embodiment of the present invention.

Further, as shown in FIG. 14, FIG. 14 is a schematic structure diagram after the first adjustment support 801, the second adjustment support 802, the press-fitting component, the shell 11 and the light stick 12 in the embodiment have been mounted. As shown in FIG. 14, the light homogenizing device may allow the light stick 12 to be finely adjusted in each direction in order to enable the incident end of the light stick to receive more incident light and/or enable the emergent end of the light stick to project the emergent light onto a designed position. As can be seen, this embodiment of the present invention may adjust the light homogenizing device and thus improve the utilization of light.

On the basis of the light homogenizing device provided in the above embodiment, an embodiment of the present invention further provides another light homogenizing device. Specifically, as shown in FIGS. 15, 16 and 17, the light homogenizing device further includes a pedestal 15, a support 16, a locking component 17 and an elastic support component 18.

Figure 15:
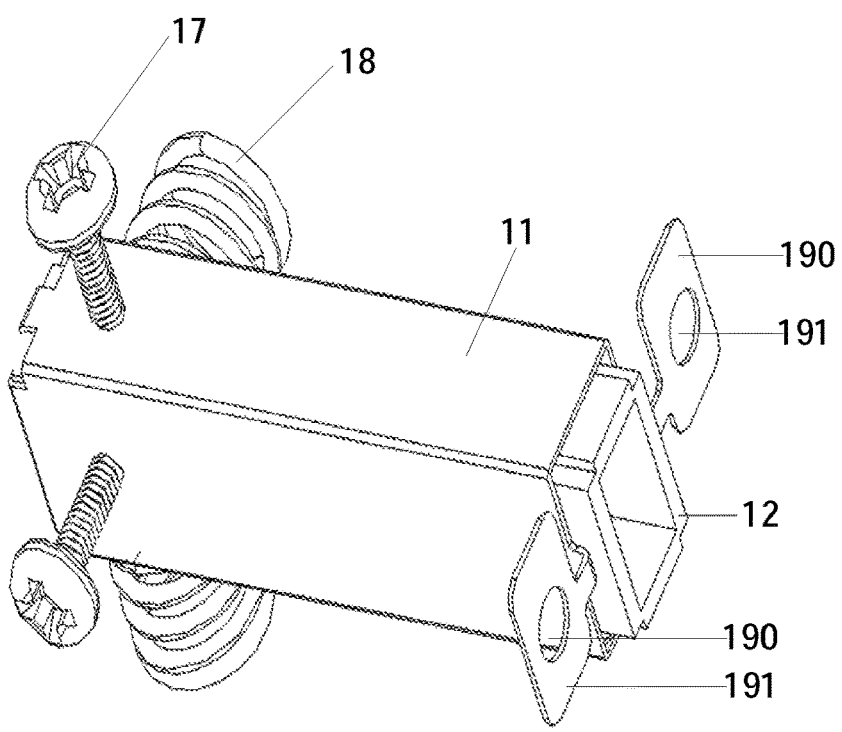
FIG. 15 is a first schematic breakdown diagram of the light homogenizing device according to an embodiment of the present invention.
Figure 16:
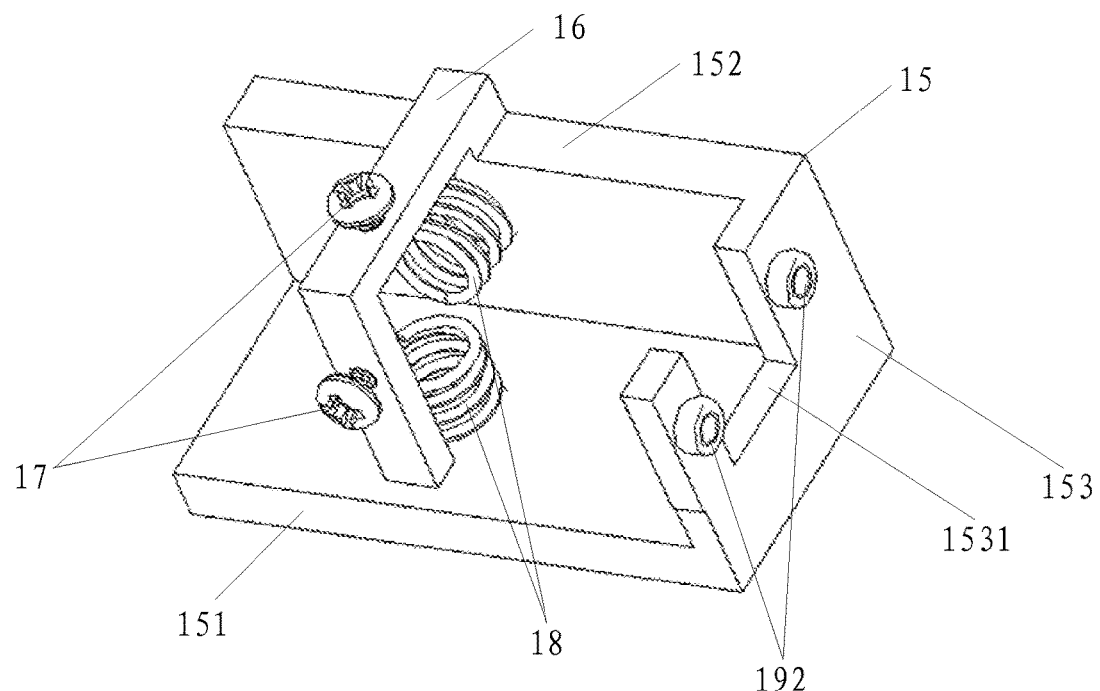
FIG. 16 is a second schematic breakdown diagram of the light homogenizing device according to an embodiment of the present invention.
Figure 17:
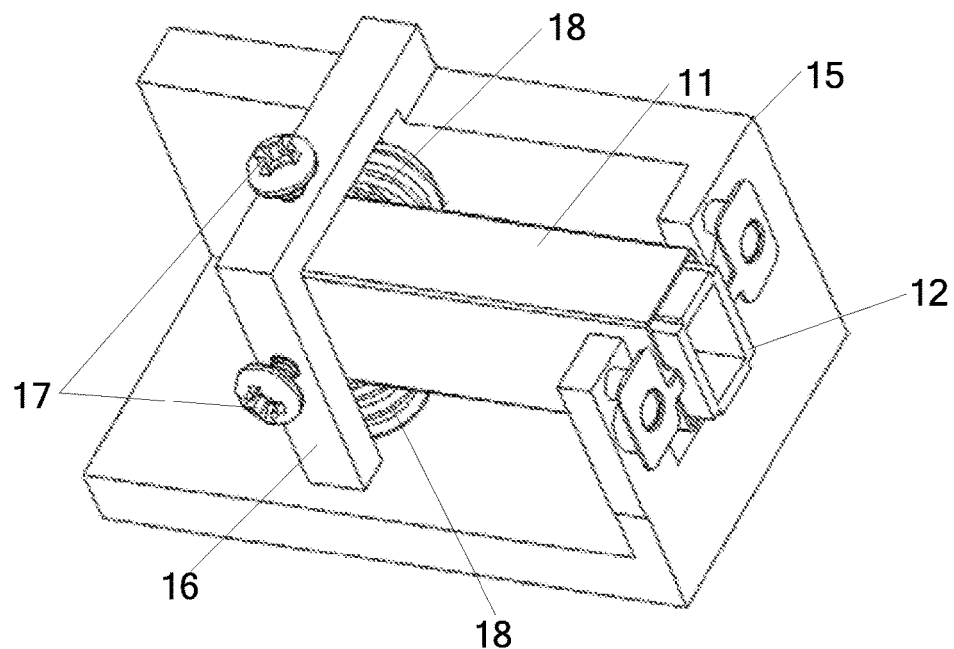
FIG. 17 is a fourth schematic structure diagram of the light homogenizing device according to an embodiment of the present invention.

Wherein, FIG. 15 is a structure diagram of the light stick 12, the shell 11, the locking component 17 and the elastic support component 18 in the light homogenizing device, FIG. 16 is a structure diagram of the pedestal 15, the support 16, the locking component 17 and the elastic support component 18 in the light homogenizing device, and FIG. 17 is an overall schematic structure diagram of the assembled light homogenizing device.

The pedestal 15 includes a bottom plate 151, a first side plate 152 vertically connected to the bottom plate 151, and a second side plate 153 vertically connected to the bottom plate 151 and adjacent to the first side plate 152. A groove 1531 for exposing the first end of the shell 11 is provided on the second side plate 153.

The first end of the shell 11 is fixed within the groove 1531.

Wherein, the second side plate 153 and the first side plate 152 may be connected fixedly to each other, or may be independent of each other. By fixedly connecting the second side plate 153 to the first side plate 152, the pedestal 15 may become more stable. Therefore, preferably, the second side plate 153 is fixedly connected to the first side plate 152.

The support 16 is fixed to the pedestal 15, the locking component 17 is located on the support 16, and the elastic support component 18 is located on a surface of the pedestal 15 opposite to the locking component 17. Both the locking component 17 and the elastic support component 18 press against the surface of the shell 11 for fixing the position of the shell 11.

It is also to be noted that, all the pedestal, the support and the shell in this embodiment may be made of iron, copper, aluminum, alloy or other metals, or may be made of ceramic, plastics or other nonmetals. In comparison with the nonmetals, the metals have better heat conductivity, ductility and strength. Therefore, the pedestal, the support and the shell in this embodiment of the present invention are preferably made of metals. In addition, in order to simplify the manufacture process of the light homogenizing device, the pedestal 15 and the support 16 are formed integrally in this embodiment. Specifically, the pedestal 15 and the support 16 may be formed integrally by a casting process.

In this embodiment of the present invention, the light homogenizing device includes a light stick, a shell, a pedestal, a support, a locking component and an elastic support component, wherein the pedestal is composed of a bottom plate, a first side plate and a second side plate, and a groove for exposing the first end of the shell is provided on the second side plate. As the first end of the shell is fixed within the groove, the first end of the shell may be accurately positioned first in this embodiment of the present invention. Second, the support is fixed to the pedestal, the locking component on the support and the elastic support component located on a surface of the pedestal opposite to the locking component press against the surface of the shell and may fix the position of the shell, so that the shell may be further prevented from shaking by the locking component and the elastic support component. Since the light homogenizing device provided in this embodiment of the present invention may accurately position the first end of the shell and may prevent the shell from shaking as a whole, the shell may be accurately positioned. Moreover, since the light stick is located within the holding chamber formed by the shell, the accurate positioning of the light stick may be realized in this embodiment of the present invention.

On the basis of the above embodiment, an embodiment of the present invention further provides a specific structure of the locking component 17.

Figure 18:
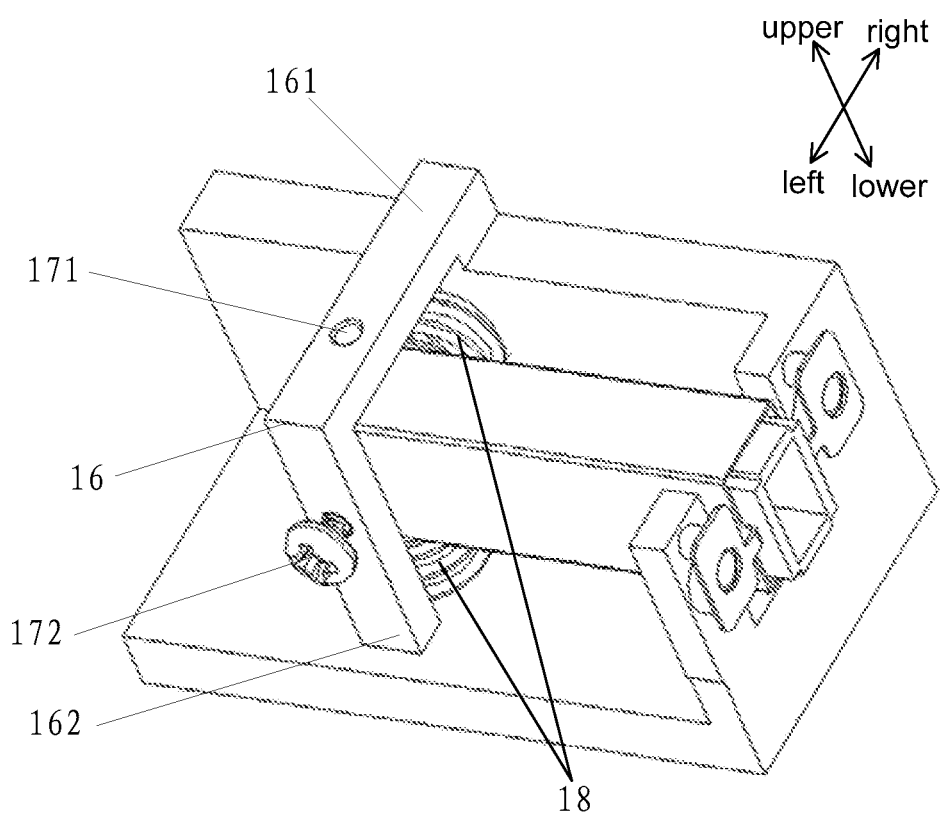
FIG. 18 is a fifth schematic structure diagram of the light homogenizing device according to an embodiment of the present invention.

Specifically, as shown in FIG. 18, the locking component 17 includes an adjustment hole 171 formed on the support 16 and an adjustment protrusion 172 adapted to the adjustment hole 171.

Exemplarily, the adjustment hole 171 may be a threaded hole, an unthreaded hole or the like, and the adjustment protrusion 172 may be a screw, a bolt or the like adapted to the adjustment hole 171. The elastic support component 18 may be a spring, an elastic sheet or the like, and the axis of the spring is vertical to a contact surface of the spring with the pedestal 15 when the elastic support component 18 is a spring.

It is also to be noted that, based on the above embodiment, those skilled in the art may conceive of replacing the elastic support component in this embodiment of the present invention with any other device which may be deformed to generate a stress under the action of an external force and restored to the original shape after the external force is removed, and this belongs to the rational transformations made to the embodiment of the present invention by those skilled in the art. Therefore, these devices shall also fall into the protection scope of the present invention. In addition, in comparison with the elastic sheet or other devices, the spring can still maintain a large resilience force after multiple times of deformation. Therefore, the present invention is realized preferably by a spring.

Optionally, the elastic support component 18 is a spring, and the cross-sectional area of one end of the spring 18 in contact with the shell 11 is smaller than that of one end of the spring 18 in contact with the pedestal 15.

By designing the spring 18 as a conical spring and making the cross-sectional area of one end of the spring 18 in contact with the shell 11 smaller than that of one end of the spring in contact with the pedestal 15, the contact surface of the shell 11 with the spring 18 may be reduced, and the adjustment distance may be accurately controlled. In addition, the contact area of the spring 18 with the pedestal 15 may also be increased, so that the spring 18 may be prevented from shifting due to an external force.

By the locking component 17 and the elastic support component 18, the position of the shell 12 may be fixed, and the position of the light stick 12 may also be adjusted. For example, the process of adjusting the position of the light stick 12 may be as follows: when the light stick 12 needs to be adjusted in a direction close to the bottom plate 151, the adjustment protrusion 172 may be pushed toward the direction close to the bottom plate 151 by rotating clockwise the adjustment protrusion 172; the shell 11 is pressed by the adjustment protrusion 172 and then presses the elastic support component 18 between the shell 12 and the bottom plate; and, the elastic support component 18 is compressed, and the shell 11 is moved in the direction close to the bottom plate 151, so that the light stick 12 within the shell 11 is driven to move in the direction close to the bottom plate 151. When the light stick 12 needs to be adjusted in a direction away from the bottom plate 151, a contact point of the elastic support component 18 with the shell 11 may be allowed to leave gradually away from the bottom plate 151 by rotating counterclockwise the elastic support component 18 opposite to the bottom plate 151, and the stress generated by the elastic support component 18 between the shell 11 and the bottom plate 151 allows the shell 11 to move in the direction away from the bottom plate 151, so that the light stick 12 within the shell 11 is driven to move in the direction away from the bottom plate 151.

Further, it can be seen from the adjustment process of the light stick that, if the adjustment hole 171, the adjustment protrusion 172 and the elastic support component 18 are formed on the light homogenizing device in only one direction, the light homogenizing device may realize the adjustment of the light stick in one direction; and, if adjustment holes 171, adjustment protrusions 172 and elastic support components 18 are formed in multiple directions, the adjustment of the light stick in multiple directions may be realized. Therefore, it is preferably to form adjustment holes 171, adjustment protrusions 172 and elastic support components 18 in multiple directions. By forming adjustment holes 171, adjustment protrusions 172 and elastic support components 18 in multiple directions, the movement of the light stick in a plane of the cross-section in any direction may be realized. In other words, based on the direction shown in FIG. 18, the upper, lower, left and right adjustment of the light stick may be realized.

Optionally, as shown in FIG. 18, the support 16 includes a horizontal rib 161 parallel to the bottom plate 151 and a vertical rib 162 parallel to the first side plate 152, and the locking component 17 is provided on both the horizontal rib 161 and the vertical rib 162. By forming adjustment holes 171, adjustment protrusions 172 and elastic support components 18 on two vertical surfaces, the adjustment of the light stick 12 in the plane of the cross-section in any direction may be realized. Therefore, such a design may reduce the number of the adjustment holes 171, the adjustment protrusions 172 and the elastic support components 18 on the light homogenizing device, simplify the structure of the light homogenizing device, and thus simplify the manufacture process of the light homogenizing device.

On the basis of the above embodiment, an embodiment of the present invention further provides a specific implementation of fixing the first end of the shell 11 within the groove 1531.

Specifically, as shown in FIGS. 15 and 16, a claw 190 is provided at the first end of the shell 11, and a first through hole 191 is provided on the claw 190; a second through 192 is provided on the second side plate 153 at a position corresponding to the first through hole 191; and, a fixing element passes through the first through hole 191 and the second through hole 192 to fix the first end of the shell within the groove.

Exemplarily, the fixing element may be specifically a screw, a bolt, a pin or the like.

It is to be noted that, when the position of the light stick 12 is adjusted in a certain direction, the direction of an acting force generated by the adjustment protrusion 172 and the direction of an acting force generated by the elastic support component 18 may not be on a straight line; and, if the direction of an acting force generated by the adjustment protrusion 172 and the direction of an acting force generated by the elastic support component 18 is not on a straight line, a torque will be generated, so that the shell 11 will drive the light stick 12 to rotate. Therefore, as shown in FIG. 15, two claws 190 are provided at the first end of the shell, and the two claws 190 are corresponding to two sides of the groove 1531, respectively. By providing two claws 190 at the first end of the shell 11 and making the two claws 190 correspond to two sides of the groove 1531, respectively, the light stick may be prevented from rotating in the above case.

Further, an embodiment of the present invention further provides another improved structure of the shell 11.

Figure 19:
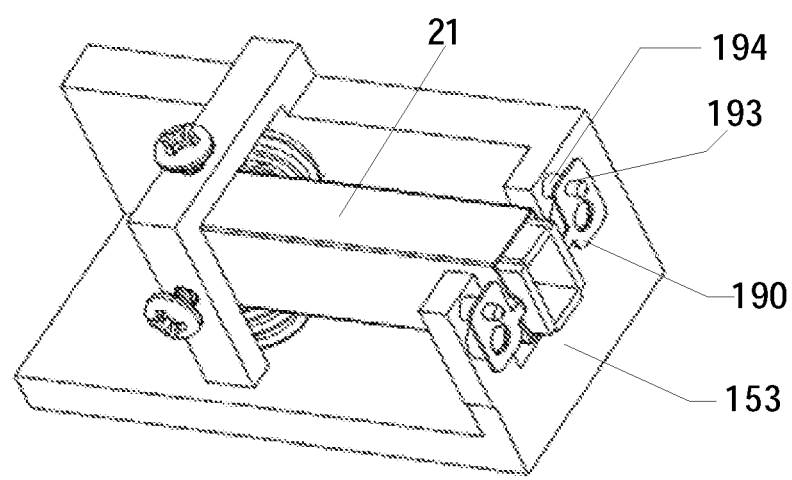
FIG. 19 is a sixth schematic structure diagram of the light homogenizing device according to an embodiment of the present invention.

Specifically, as shown in FIG. 19, a positioning hole 193 is further formed on the claw 190, and a positioning column 194 is provided on the second side plate 153 at a position corresponding to the positioning hole 193.

Through the positioning hole 193 on the claw 190 and the positioning column 194 on the second side plate 153, the shell 11 may be accurately placed at the preset position when in mounting, and the accurate positioning may be realized when the shell 11 and the second side plate 153 are fixed.

Furthermore, a spacer is further provided between the claw 190 and the second side plate 153.

First, by providing a spacer between the claw 190 and the second side plate 153, the machining tolerance of the shell 11 and the pedestal 15 in the production process may be eliminated, and the shell and the pedestal are connected more tightly. Second, it can be seen from the adjustment process of the light stick in the above embodiment that, in the above embodiment, the position of the light stick may be adjusted only in the plane of the cross-section of the light stick but cannot be adjusted in a direction vertical to the cross-section of the light stick; while in this embodiment of the present invention, by additionally providing a spacer between the claw 190 and the second side plate 153, the position of the light stick may be further adjusted in a direction vertical to the cross-section of the light stick by adjusting the thickness of the spacer. In other words, in this embodiment of the present invention, the adjustment of the light stick in the upper, lower, left, right, front and rear directions may be realized.

Still another embodiment of the present invention provides a laser projection apparatus. The laser projection apparatus includes the light homogenizing devices provided in any one of the above embodiments. Exemplarily, the laser projection apparatus may be a laser TV set, a projector or the like.

Figure 20:
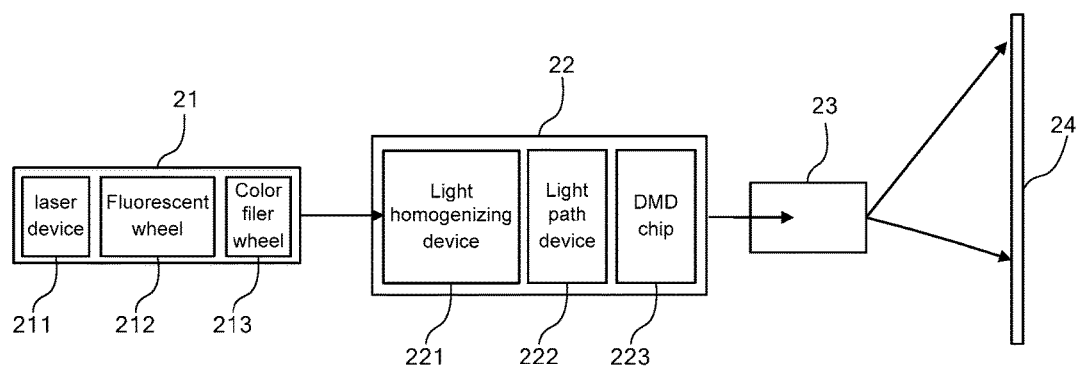
FIG. 20 is a schematic structure diagram of a laser projection apparatus according to an embodiment of the present invention.

Specifically, as shown in FIG. 20, the laser projection apparatus may include a laser light source 21, a light engine 22, a lens 23 and a slide screen 24. Wherein, the laser light source 21 may include a laser device 211, a fluorescent wheel 212, a color filter wheel 213 or other components. The laser device 211 may be a monochromatic laser device, or may be a bichromatic laser device. At least one kind of fluorescent powder is provided on the fluorescent wheel 212, and laser light emitted by the laser device 211 can be mixed with exciting light generated by the fluorescent wheel to form white light. The color filter wheel 213 filters the mixed light in order to improve the purity of fluorescence. The light engine 22 includes a light homogenizing device 221, a light path device 222, a Digital Micro mirror Device (DMD) chip 223 or other components. Wherein, the light homogenizing device is the light homogenizing device provided in any one of the above embodiments. Light beams sequentially output by the color filter wheel 213 enter the light homogenizing device 221 for homogenizing and/or for changing the divergent angle, so that the light beams meet the requirements of the DMD on the beam energy distribution and the incident angle. Then, light is transmitted to the DMD chip by the light path device 222, and the DMD chip receives light of three primary colors and is rotated within a certain range under the driving of the current so as to adjust the amount of light entering the lens 23, so that different colors are presented on the lens. The lens 23 receives the light modulated by the DMD, and the light is eventually transmitted to the projection screen 24 by refraction, reflection or other processes by a plurality of optical lenses so as to form a projected image.

The foregoing descriptions merely show specific implementations of the present invention, but the protection scope of the present invention is not limited thereto. Any person of skill in the art may easily conceive of variations or replacements within the technical scope disclosed by the present invention, and these variations or replacements shall fall into the protection scope of the present invention. Accordingly, the protection scope of the present invention shall be subject to the protection scope of the claims.

What is claimed is:

1. A light homogenizing device, comprising a shell and a light stick, wherein:
    the shell forms a holding chamber having openings at both ends thereof; the light stick is located within the holding chamber, and an incident end and an emergent end of the light stick correspond to the openings at both ends of the holding chamber, respectively; and, an elastic component is provided on at least one surface of the shell, with a first end of the elastic component being connected to the shell while a second end thereof extending into the interior of the holding chamber and pressing against the light stick;
    wherein the light homogenizing device further comprises an adjustment structure; and
    the adjustment structure is configured to adjust the position of the shell;
    wherein the adjustment structure comprises a first wall board, a second wallboard, a third wallboard and a fourth wallboard; the first wallboard, the second wallboard, the third wallboard and the fourth wallboard are enclosed to form an accommodating chamber; and, adjustment holes and adjustment protrusions adapted to the adjustment holes are formed on both the first wallboard and the second wallboard, and elastic support components are provided on the third wallboard and the fourth wallboard respectively;
    wherein the light homogenizing device further comprises a press-fitting component connected to the first adjustment support; and
    a press is provided on the press-fitting component, with a first end of the press being fixed to the press-fitting component while a second end thereof extending into the interior of the accommodating chamber and pressing against the shell.

2. The light homogenizing device according to claim 1, wherein the shell is made of at least one sheet, and the sheet is lap jointed and fixed at a joint.

3. The light homogenizing device according to claim 1, wherein the shell is adhered to the light stick.

4. The light homogenizing device according to claim 3, wherein a window is provided on at least one surface of the shell and used for injecting an adhesive between a side wall of the light stick and an inner wall of the shell.

5. The light homogenizing device according to claim 1, wherein a distance between the openings at both ends of the shell is smaller than a distance between the incident end and the emergent end of the light stick.

6. The light homogenizing device according to claim 1, wherein at least one protrusion for positioning the light homogenizing device when mounting the light homogenizing device is provided on an outer surface of the shell.

7. The light homogenizing device according to claim 1, wherein an end of the adjustment protrusion pressing against the shell is hemispherical.

8. A light homogenizing device, comprising a shell and a light stick, wherein:
    the shell forms a holding chamber having openings at both ends thereof; the light stick is located within the holding chamber, and an incident end and an emergent end of the light stick correspond to the openings at both ends of the holding chamber, respectively; and, an elastic component is provided on at least one surface of the shell, with a first end of the elastic component being connected to the shell while a second end thereof extending into the interior of the holding chamber and pressing against the light stick:
    wherein the light homogenizing device further comprises a pedestal, a support, a locking component and an elastic support component;
    the pedestal comprises a bottom plate, a first side plate vertically connected to the bottom plate, and a second side plate vertically connected to the bottom plate and adjacent to the first side plate, with a groove for exposing the first end of the shell being provided on the second side plate;
    the first end of the shell is fixed within the groove; and
    the support is fixed to the pedestal, the locking component is located on the support, and the elastic support component is located on a surface of the pedestal opposite to the locking component; and, both the locking component and the elastic support component press against the surface of the shell for fixing the position of the shell.

9. The light homogenizing device according to claim 8, wherein the locking component comprises: an adjustment hole formed on the support and an adjustment protrusion adapted to the adjustment hole.

10. The light homogenizing device according to claim 8, wherein the support comprises a horizontal rib parallel to the bottom plate and a vertical rib parallel to the first side plate, and the locking component is provided on both the horizontal rib and the vertical rib.

11. The light homogenizing device according to claim 8, wherein a claw is provided at the first end of the shell, and a first through hole is provided on the claw; a second through hole is provided on the second side plate at a position corresponding to the first through hole; and, a fixing element passes through the first through hole and the second through hole to fix the first end of the shell within the groove.

12. The light homogenizing device according to claim 11, wherein a spacer is further provided between the claw and the second side plate.

13. The light homogenizing device according to claim 8, wherein the elastic support component is a spring, and the cross-sectional area of one end of the spring in contact with the shell is smaller than that of one end of the spring in contact with the pedestal.

14. A laser projection apparatus, comprising:
  a laser light source, a light engine and a lens, which are arranged successively, wherein the light engine comprises a light homogenizing device comprising a shell and a light stick;
  the shell forms a holding chamber having openings at both ends thereof; the light stick is located within the holding chamber, and the openings at both ends of the holding chamber correspond to an incident end and an emergent end of the light stick, respectively; and, an elastic component is provided on at least one surface of the shell, with a first end of the elastic component being connected to the shell while a second end thereof extending into the interior of the holding chamber and pressing against the light stick;
  wherein the light homogenizing device further comprises a pedestal, a support, a locking component and an elastic support component; the pedestal comprises a bottom plate, a first side plate vertically connected to the bottom plate, and a second side plate vertically connected to the bottom plate and adjacent to the first side plate, with a groove for exposing the first end of the shell being provided on the second side plate; and the first end of the shell is fixed within the groove; the support is fixed to the pedestal, the locking component is located on the support, and the elastic support component is located on a surface of the pedestal opposite to the locking component; and, both the locking component and the elastic support component compress the surface of the shell for fixing the position of the shell.

15. The laser projection apparatus according to claim 14, wherein the light homogenizing device further comprises an adjustment structure; the adjustment structure forms an accommodating chamber having openings at both ends thereof; the shell is located within the accommodating chamber, and an incident end and an emergent end of the light stick correspond to the openings at both ends of the accommodating chamber; adjustment holes and adjustment protrusions adapted to the adjustment holes are formed on at least one surface of the adjustment structure, and the adjustment protrusion pass through the adjustment holes and press against the shell; and, elastic support components are provided on a surface opposite to the surface on which the adjustment holes are formed, with a first end of each of the elastic support components being connected to the adjustment structure while a second end thereof extending into the interior of the accommodating chamber and pressing against the shell.

* * * * *